(12) United States Patent
Huang et al.

(10) Patent No.: US 7,814,372 B2
(45) Date of Patent: Oct. 12, 2010

(54) METHOD AND SYSTEM FOR EXCEPTION DETECTING AND ALERTING

(75) Inventors: Qinping Huang, Sunnyvale, CA (US); Manish Maheshwari, Los Altos, CA (US)

(73) Assignee: eBay Inc., San Jose, CA (US)

( * ) Notice: Subject to any disclaimer, the term of this patent is extended or adjusted under 35 U.S.C. 154(b) by 360 days.

(21) Appl. No.: 11/852,169

(22) Filed: Sep. 7, 2007

(65) Prior Publication Data
US 2009/0070638 A1     Mar. 12, 2009

(51) Int. Cl.
G06F 11/00 (2006.01)
(52) U.S. Cl. .............................. 714/47; 714/38; 714/48; 712/244
(58) Field of Classification Search ............... 714/38, 714/47, 48; 712/244
See application file for complete search history.

(56) References Cited

U.S. PATENT DOCUMENTS

| | | | |
|---|---|---|---|
| 4,813,011 A * | 3/1989 | Kulakowski et al. ......... 711/4 |
| 2004/0260474 A1 * | 12/2004 | Malin et al. ................... 702/6 |
| 2006/0282534 A1 * | 12/2006 | Berg ........................... 709/225 |
| 2009/0070638 A1 * | 3/2009 | Huang et al. .................. 714/57 |
| 2009/0070733 A1 | 3/2009 | Huang et al. |

OTHER PUBLICATIONS

"Sherlock Holmes on Log Files", Jun. 1, 2007, Collier-Brown.*

* cited by examiner

Primary Examiner—Emerson C Puente
(74) Attorney, Agent, or Firm—Schwegman, Lundberg & Woessner, P.A.

(57) ABSTRACT

Methods and system for exception detecting and alerting are described. An exception indicating an occurrence of an error in an application and a path to the exception in an application space may be received. The received exception may be compared to a stored exception in a prior version of an exception data structure to determine whether the received exception is a new exception. The exception data structure may include a plurality of stored exceptions. The results of the comparison may be provided.

8 Claims, 15 Drawing Sheets

METHOD AND SYSTEM FOR EXCEPTION DETECTING AND ALERTING

BACKGROUND

An error may occur in an application that is running in a testing system and/or production system. The error may be reported in the system as an exception. Environmental exceptions that may occur in the system include unavailability of a device in the system, inability to open a file, disconnection of a database, and the like. Programming logic exceptions may also incur in the system and may include an incorrect call, an invalid parameter, divide by zero error, and the like.

The exception may be written to a log file for tracking purposes and to enable further analysis. However, it may be time consuming to review the log in an attempt to determine which exception caused a particular error to occur in the system especially when the application is frequently changed. For example, a developer may be unable to distinguish whether a particular error occurred with the same application or a different application on the server, the error was previously resolved but is occurring again, the error is the result of an environmental change or a change to the code of the application, and the like.

BRIEF DESCRIPTION OF THE DRAWINGS

Some embodiments are illustrated by way of example and not limitation in the figures of the accompanying drawings in which.

DETAILED DESCRIPTION

Example methods and systems for exception handling and alerting are described. In the following description, for purposes of explanation, numerous specific details are set forth in order to provide a thorough understanding of example embodiments. It will be evident, however, to one skilled in the art that the present invention may be practiced without these specific details.

In an example embodiment, an exception indicating an occurrence of an error in an application and a path to the exception in an application space may be received. The received exception may be compared to a stored exception in a prior version of an exception data structure to determine whether the received exception is a new exception. The exception data structure may include a plurality of stored exceptions. The results of the comparison may be provided.

In an example embodiment, an exception from an occurrence of an error in an application running in an application space may be detected. A path to the exception in the application space may be accessed. The exception and the path may be provided.

In an example embodiment, a total count of an occurrence of a parameter in an application may be accessed for a current time period and a past time period. The total count of the current time period may be normalized based on information regarding measurement of the total count during the past time period. A frequency of the occurrence of the parameter may be determined for the current time period and the past time period based on the normalized total count. A determination of whether the frequency of the current time period as compared to the past time period transgresses a threshold. A rater alert may be provided to a user based on the determination.

Figure 1:
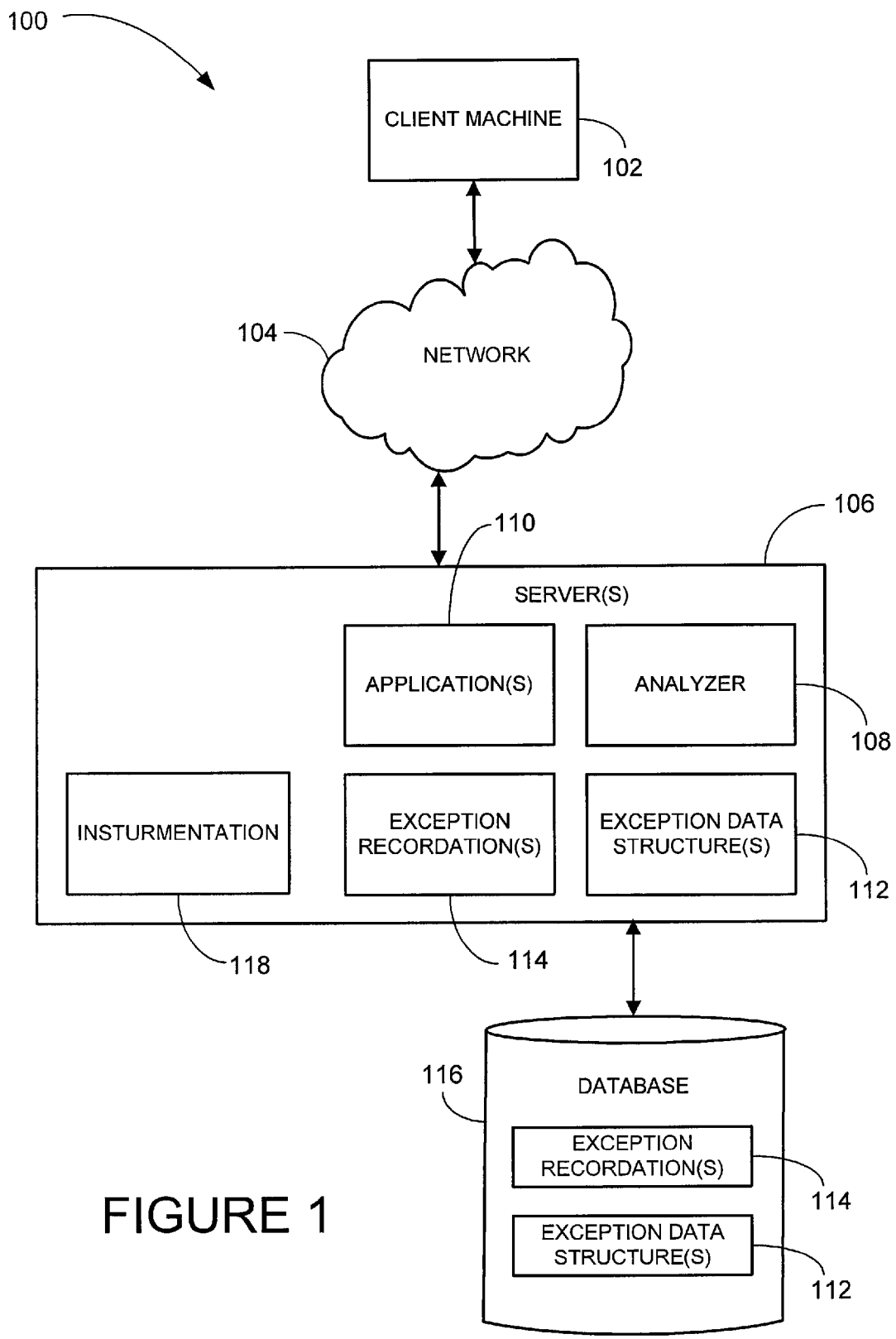
FIG. 1 is a block diagram of a system, according to an example embodiment.

FIG. 1 illustrates an example system 100 in which a client machine 102 may communicate through a network 104 with one or more applications 110 running in an application space on one or more servers 106.

The client machine 102 may be a computing system, mobile phone, a personal digital assistant (PDA), a gaming unit, a portable computing unit, and the like. The network 104 may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The applications 110 may provide requested functionality to a user operating the client machine 102. The applications 110 may include, by way of example, a billing application, a payment application, a listing application, a shipping application, and the like. Other types of applications may also be used. The applications 110 may be written in JAVA programming language, C++ programming language, or otherwise written. An example embodiment of an application is described in greater detail below.

The code of the application 110 may include a version number that may be used to distinguish one release of the application 110 from another.

In an example embodiment, the applications 110 may include one or more unresolved errors. The old errors may not cause a significant impairment to operation of the application 110 that warrant an organization to expend resources to identified and resolve the error.

The servers 106 may include an analyzer 108 to process exceptions received from the applications 110. The analyzer 108 may store received exceptions and/or global identifiers associated with exceptions in a new version of the exception data structure 112.

The exception data structures 112 may be used to determine whether the exception has occurred before. The exception data structure 112 may be stored in memory of the servers 106. The exception data structure 112 may include a number of stored exceptions received from the analyzer 108. By way of an example, the exception data structure 112 may be a cube. The cube may include a grouping of interrelated trees. The grouping of interrelated trees may include a source tree and a number of application trees. An application tree of the application trees may represent a particular application. The application tree of an application of the applications 110 may include a number of versions. A version of the number of versions may include a number of exceptions.

A version of the exception data structures 112 may include a single entry (e.g., a record) for each exception. When the same exception occurs multiple times, the single entry may be updated with additional information. The exception data structures 112 may include a number of prior versions of the exception data structure and a new version of the exception data structure.

The exception data structure 112 and/or the exception recordations 114 may respectively be in a database 116 as an exception data structure 112 and/or exception recordations 114 on a periodic basis (e.g., every minute) to prevent loss of data as a result of a problem with the servers 106. The database 116 may be primarily used for recovery, but may also be otherwise used.

In an example embodiment, instrumentation 118 may be used to log operations of the application 110.

Figure 2:
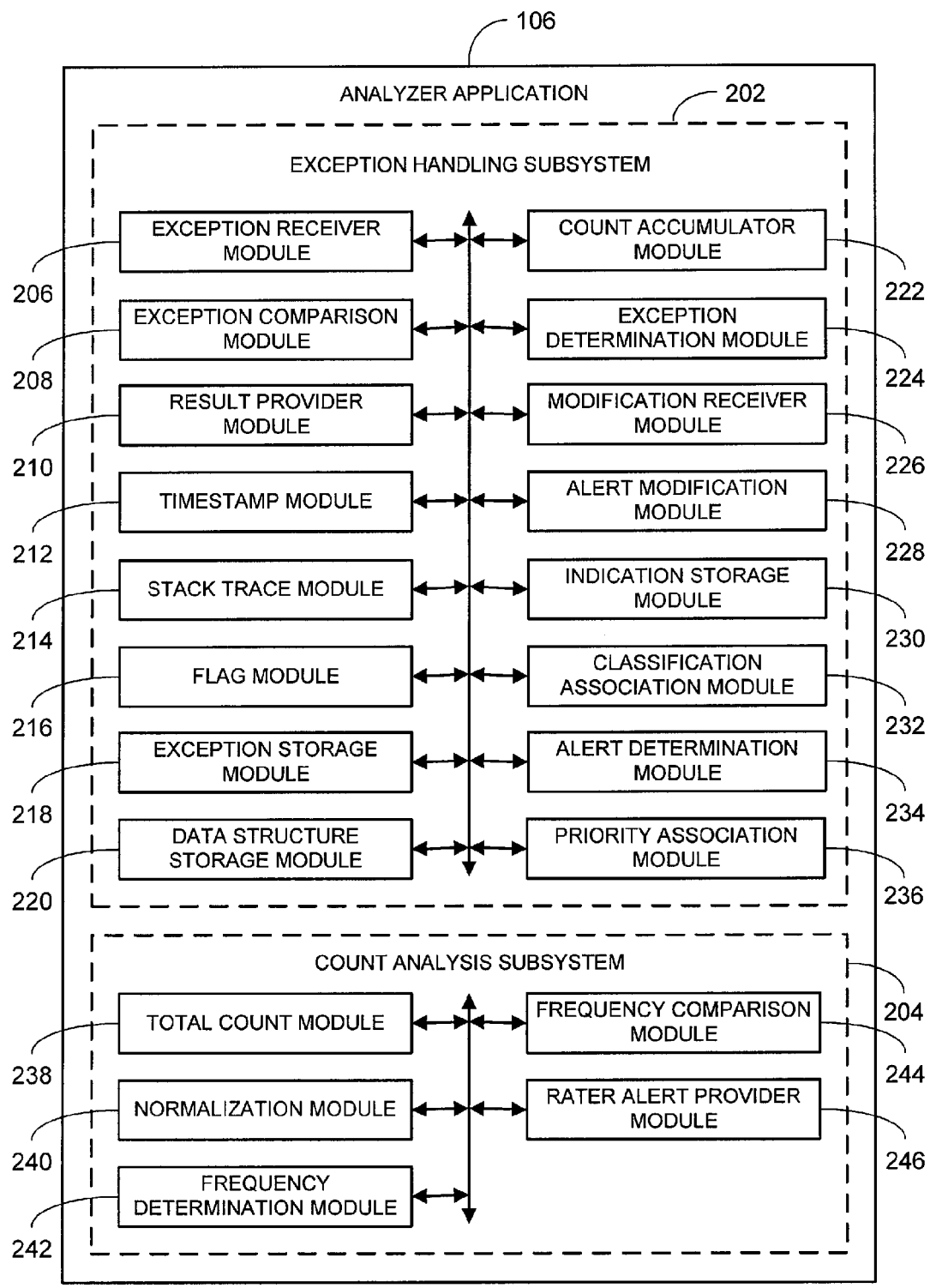
FIG. 2 is a block diagram of an example analyzer that may be deployed within the system of FIG. 1 according to an example embodiment.

FIG. 2 is an example of an analyzer 108 that may be deployed in the system 100 (see FIG. 1) or another system according to an example embodiment. The analyzer 108 may include an exception handling subsystem 202, a count analysis subsystem 204, and/or another subsystem.

The exception handling subsystem 202 may include an exception receiver module 206, an exception comparison module 208, a result provider module 210, a timestamp module 212, a stack trace module 214, a flag module 216, an exception storage module 218, a data structure storage module 220, a count accumulator module 222, an exception determination module 224, a modification receiver module 226, an alert modification module 228, an indication storage module 230, a classification association module 232, an alert determination module 234, and/or a priority association module 236. Other modules may also be used.

The exception receiver module 206 receives an exception indicating an occurrence of an error in an application (e.g., of the applications 110 of FIG. 1) and a path to the exception in an application space and/or a global exception identifier. The global exception identifier may represent the received exception and the path to the received exception. The global exception identifier may be unique in a code base, the code base including the applications 110 (e.g., the application from which the exception was received and at least one additional application).

The exception comparison module 208 compares the received exception to a stored exception and/or the global exception identifier to a stored identifier in a prior version and/or an older version of the exception data structure 112 to determine whether the received exception is a new exception.

The result provider module 210 provides the results (e.g., an alert) of the comparison. The timestamp module 212 stores a timestamp for the received exception.

The stack trace module 214 stores a link to a stack trace of the application 110 at a position in which the exception occurred. The stack trace may provide a line by line execution of the application showing the instructions called. The stack trace may include, by way of an example, a file number, a line number, a class name, and a method name.

The flag module 216 sets a new exception flag or an old exception flag for the received exception. The exception storage module 218 stores the received exception and/or a global identifier in a current version of the exception data structure 112. The received exception and/or the global identifier may be index in the current version of the exception data structure 112.

The data structure storage module 220 stores a modified portion of the new version of the exception data structure 112 in the database 116. The count accumulator module 222 accumulates a count of the received exception in the current version of the exception data structure 112.

The exception determination module 224 determines whether the received exception is the new based on one or more comparisons. The modification receiver module 226 receives an alert modification instruction of a reset type for the alert.

The alert modification module 228 modifies the alert in accordance with the alert modification instruction. The indication storage module 230 stores an indication not to provide a further alert.

The classification association module 232 associates a classification with the received exception. The alert determination module 234 determines whether an indication (e.g., an indication of not to alert) has been recorded.

The priority association module 236 associates a priority to the received exception based on the rater alert, whether the received exception is a new exception, and/or a different factor. The priority may define a target time period for resolving the error in the application. By way of an example, a priority of one may mean that the error has been allotted one day for resolution, a priority of two may mean that the error has been allotted three days for resolution, a priority of three may mean that the error has been allotted two to three weeks for resolution, and a priority of four may mean that the error has been allotted an unfixed time period for resolution. A different amount of priorities and different time periods may be used.

The count analysis subsystem 204 may include a total count module 238, a normalization module 240, a frequency determination module 242, a frequency comparison module 244, and/or a rater alert provider module 246. Other modules may also be used.

The total count module 238 accesses or determines a total count of an occurrence of a parameter in the application 110 for a current time period and a past time period.

The normalization module 240 normalizes the total count of the current time period based on another count (e.g., total request count or a total transaction count) during the same time period.

The frequency determination module 242 determines a frequency of the occurrence of the parameter for the current time period and the past time period based on the normalized total count and/or determines a frequency of the received exception in a current time period and at least one addition time period.

The frequency comparison module 244 determines whether the frequency of the current time period compared to the past time period is greater than a threshold.

The rater alert provider module 246 provides a rater alert to a user based on the determination. The rater alert may be provided by presenting a graph of the frequency of the occurrence from the current time period and the past time period to a user.

Figure 3:
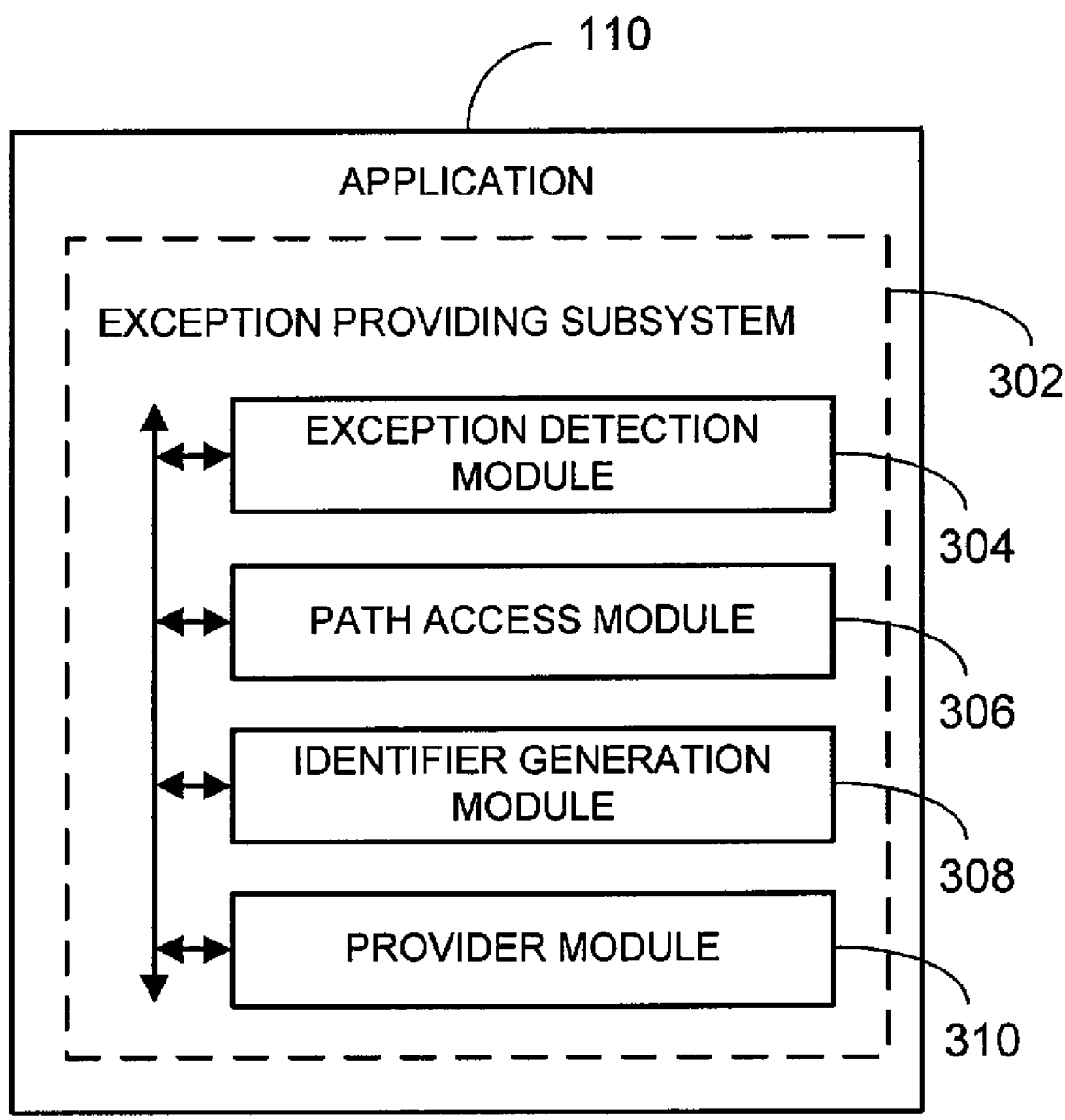
FIG. 3 is a block diagram of an example application that may be deployed within the system of FIG. 1 according to an example embodiment.

FIG. 3 is an example of an application 110 that may be deployed in the system 100 (see FIG. 1) or another system according to an example embodiment. The application 110 may include an exception providing subsystem 302 and/or another subsystem.

The exception providing subsystem 302 may include an exception detection module 304, a path access module 306, an identifier generation module 308, and/or a provider module 310. Other modules may also be used.

The exception detection module 304 detects an exception from an occurrence of an error in the application 110 running in an application space.

The path access module 306 accesses a path to the exception in the application space. The path may include an application name, a domain name, company name, a package name, a module name, a class name, and/or a method name for the occurrence of the exception.

The identifier generation module 308 generates a global exception identifier. The global exception identifier may be associated with the path to the exception and a name of the exception.

The provider module 310 provides the exception and the path and/or the global exception identifier.

Figure 4:
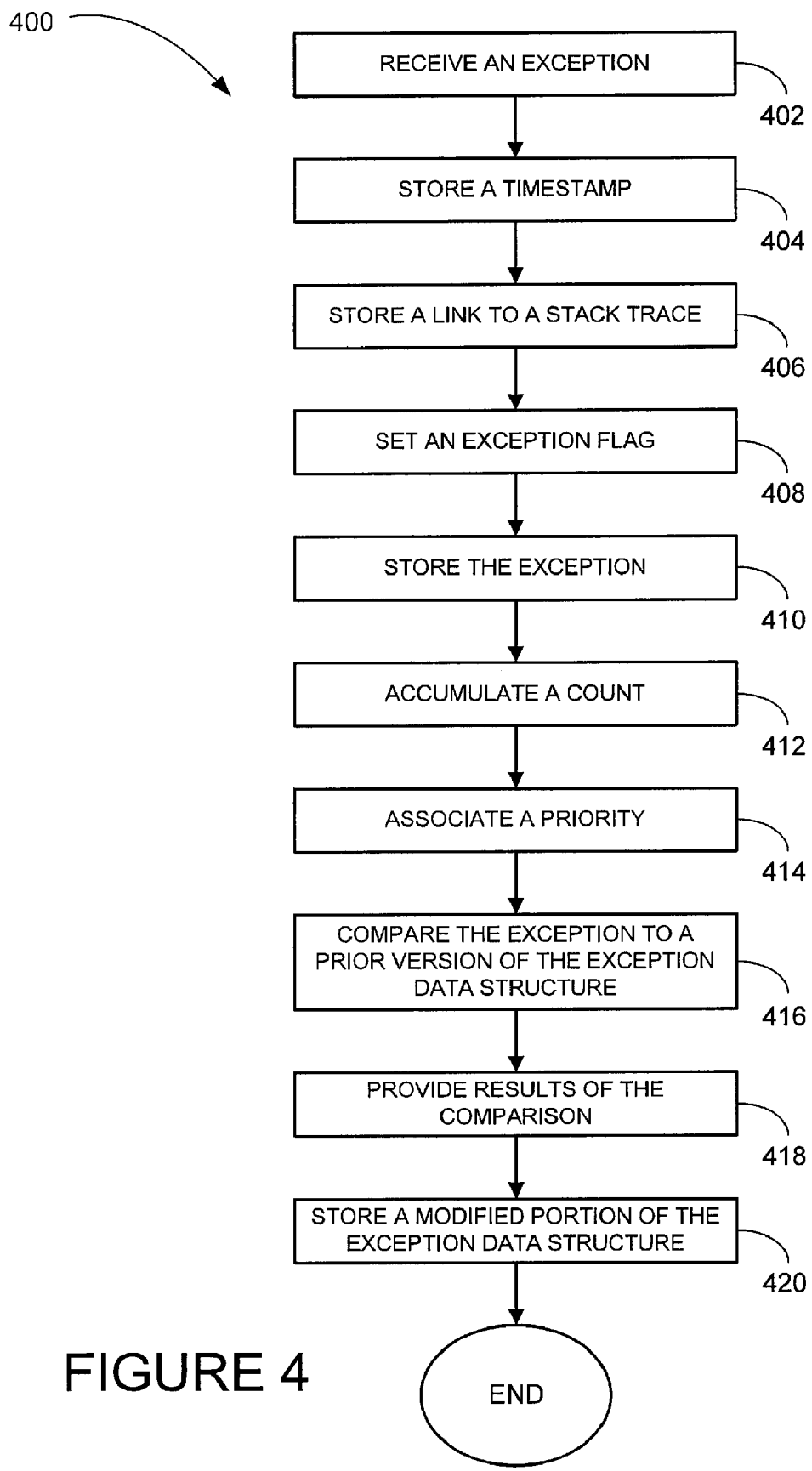
FIG. 4 is a flowchart illustrating a method for processing an exception according to an example embodiment.

FIG. 4 illustrates a method 400 for processing an exception according to an example embodiment. The method 400 may be performed by the analyzer 108 (see FIG. 1) or another application in the system 100 or another system.

An exception indicating an occurrence of an error in the application 110 and a path to the exception in an application space and/or a global identifier is received at block 402. The exception may be a checked exception or a runtime exception.

The global exception identifier may represent the received exception and the path to the received exception. The path may include an application name, a domain name, company name, a package name, a module name, a class name, and/or a method name for the occurrence of the exception.

A timestamp may be stored for the received exception at block 404.

At block 406, a link to a stack trace of the application 110 may be stored at a position in which the exception occurred.

A new exception flag or an old exception flag may be set for the received exception at block 408.

The received exception may be stored in a current version of the exception data structure at block 410. By way of an example, the received exception may be stored in the current version of the exception data structure 112 by the application 110, by a version of the application 110, and by a revision of the application 110. The exception may be indexed in the current version of the exception data structure 112 or otherwise stored.

In an example embodiment, namespace may be associated with the received exception and stored in the exception data structure 112 to enable the received exception to be distinguished from other exceptions.

In an example embodiment, the received exception may be stored within the exception data structure 112 in an application tree associated with the application 110. The application tree may be among a number of available application trees in the exception data structure 112.

A count of the received exception may be accumulated in the current version of the exception data structure 112 at block 412. The count of the received exception may be accumulated for a single time period or a number of time periods in the current version of the exception data structure 112. For example, the counts may be performed on the last ten minutes of data, the last thirty minutes of data, and the last sixty minutes of data. However, other time periods may also be used.

At block 414, the received exception is compared to a stored exception in a prior version of an exception data structure 112 to determine whether the received exception is a new exception. The prior version of the exception data structure 112 may be used as baseline for the determination.

A priority may be associated with the received exception at block 416. The priority may define a target time period for resolving the error in the application 110.

In an example embodiment, a global exception identifier may be used to compare the received exception to the prior version of an exception data structure 112. The global exception identifier may be associated with the received exception.

The results of the comparison are provided at block 418. The results may be used to determine how the exception should be handled.

A modified portion of the new version of the exception data structure 112 may be stored in a database at block 420. Storing the modified portion of the new version may include updating the new version of the exception data structure 112 in the database 116.

Figure 5:
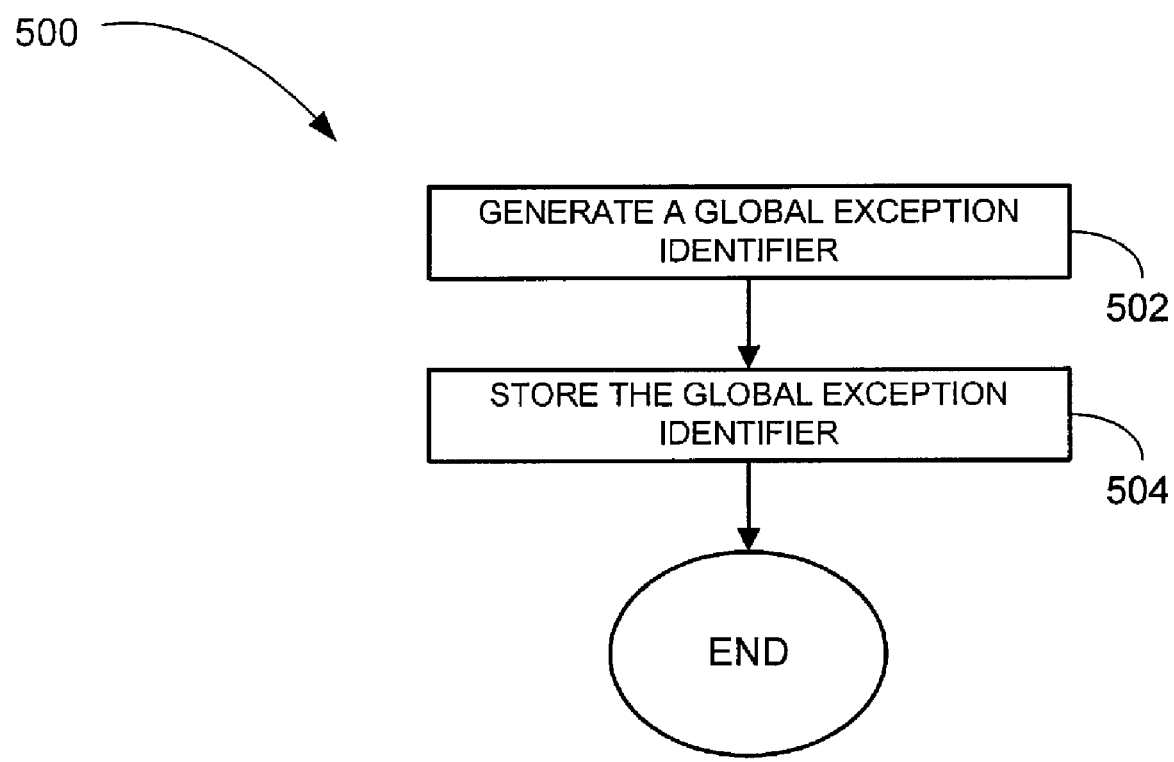
FIG. 5 is a flowchart illustrating a method for storing an exception according to an example embodiment.

FIG. 5 illustrates a method 500 for storing an exception according to an example embodiment. The method 500 may be performed at block 410 (see FIG. 4) or otherwise performed.

A global exception identifier is generated at block 502. The global exception identifier may be associated with an exception and a path to the exception. The global exception identifier may be unique in a code base that includes including the application 110 and one or more applications.

The global exception identifier is stored in the current version of the exception data structure 112 at block 504.

Figure 6:
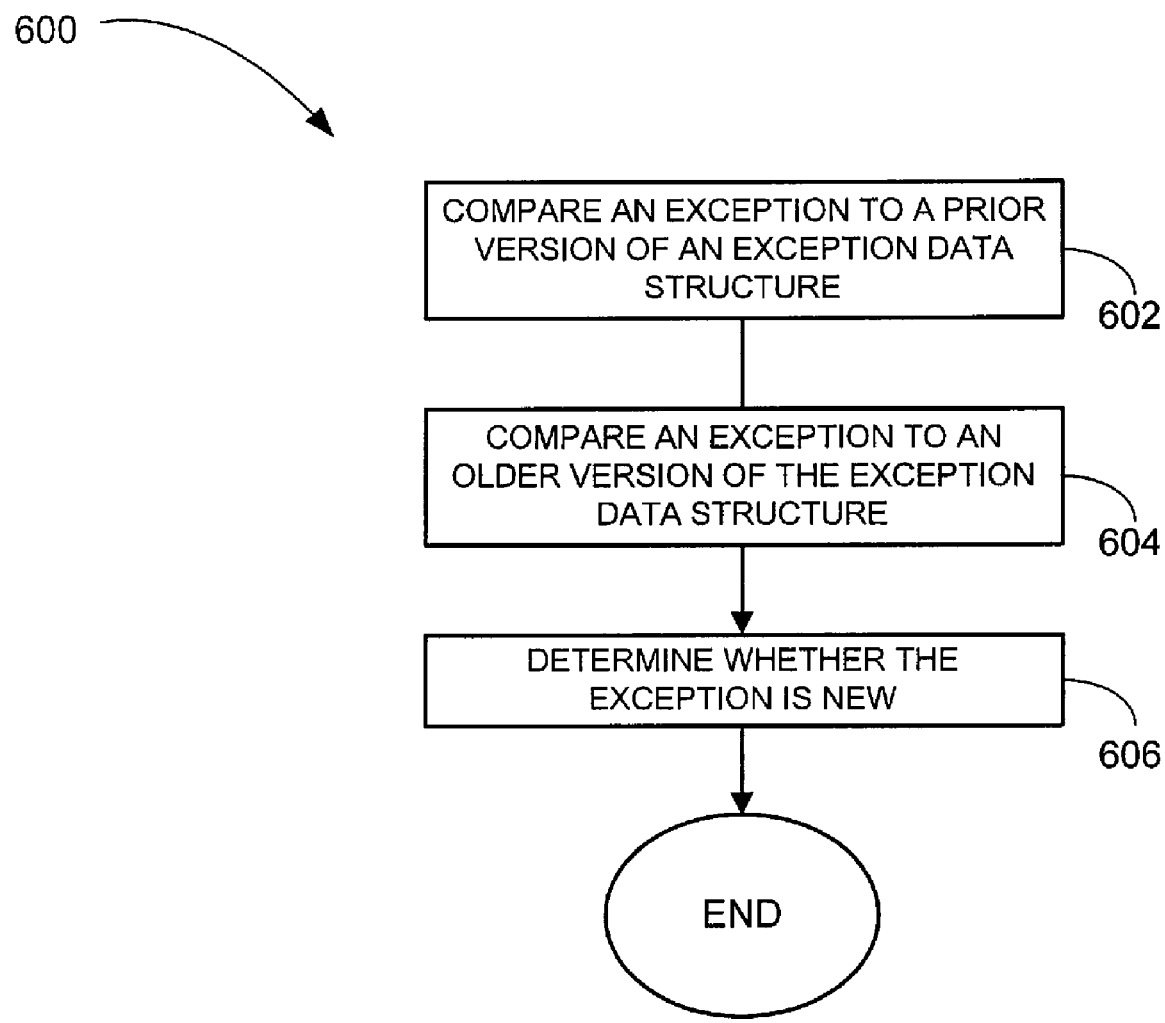
FIG. 6 is a flowchart illustrating a method for exception comparing according to an example embodiment.

FIG. 6 illustrates a method 600 for exception comparing according to an example embodiment. The method 600 may be performed at block 416 (see FIG. 4) or otherwise performed.

A received exception is compared to a stored exception in a prior version of the exception data structure 112 at block 602.

At block 604, the received exception is compared to the stored exception in an older version of the exception data structure 112. The older version of the exception data structure 112 may be older than the prior version.

A determination of whether the received exception is a new exception based on the comparisons is made at block 606.

Figure 7:
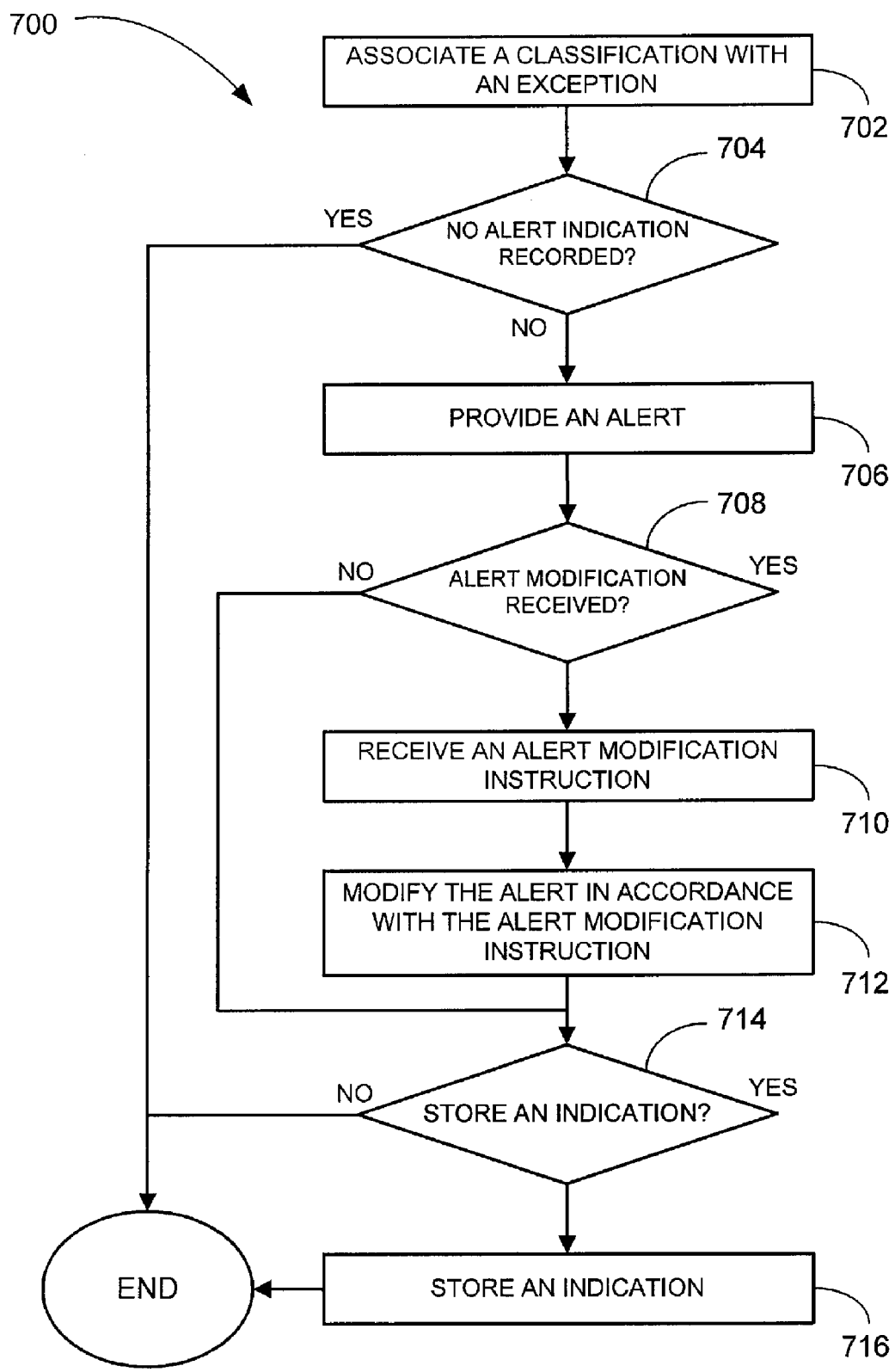
FIG. 7 is a flowchart illustrating a method for providing results according to an example embodiment.

FIG. 7 illustrates a method 700 for providing results according to an example embodiment. The method 700 may be performed at block 418 (see FIG. 4) or otherwise performed.

A classification is associated with a received exception at block 702. The classification may be based on whether the received exception occurred in an earlier version than the prior version of the exception data structure 112.

The classification may be associated based on the comparison performed at block 416 (see FIG. 4). The classification may include, by way of example, a new to the application classification, a skip version classification, an old alert always enabled classification, or an old no alert classification.

Examples of these classifications are detailed below; however, other types of classifications may also be used.

The new exception to the application classification may indicate that the exception is new to the application 110 and has not occurred in the prior version of the exception data structure 112 and/or an older version of the exception data structure 112.

The skip version classification may indicate that the exception occurred in an older version of the exception data structure 112, the exception disappeared, and the exception has now occurred again in the new version.

The old alert always enabled classification may indicate that an alert is always provided, even though the alert comes from an exception that has occurred in a past version. For example, errors that are deemed critical problems may be classified with the old alert always enabled classification.

The old no alert classification may indicate an alert that has occurred in a past version and may be ignored. For example, a unique constraint violation may be classified as an old no alert classification.

A determination may be made at decision block 704 as to whether an indication of not to alert has been recorded. If a determination is made that the indication has been recorded, the method 700 may terminate. If a determination is made that the indication has not been recorded at decision block 704, the method may proceed to block 706.

The alert of the alert type may be provided regarding the received exception at block 706. The alert may be provided based on the classification of the received exception and/or the determination of the indication.

The alert type provided may be based on the classification of the received exception. The alert type may be, by way of example, a new exception alert, an escape version alert, a rater alert, or an always enable alert. Other alert types may also be used.

A determination may be made at decision block 708 as to whether an alert modification instruction of a reset type for the alert has been received. The reset type of the alert modification instruction may include, by way of an example, a disable for an edition reset, a disable for a revision reset, a disable forever reset, an enabled always reset, or an always disable except skip revision reset. Other types of reset types may also be used.

The disable for an edition reset may reset the alert so that the error will be fixed in the next edition. The disable for a revision reset may reset the alert so that the error will be fixed in the next revision. The disable forever reset may reset the alert so that a further alert is not provided (e.g., for noncritical errors). The enabled always reset may always provide the alert (e.g., for a critical error). The always disable except skip revision reset may reset the alert unless the exception occurs disappears on a prior version and then reoccurs in a current version.

If the alert modification instruction has been received, the alert may be modified in accordance with the alert modification instruction at block 712. If a determination is made that the alert modification instruction has not been received at decision block 708 or upon completion of the operations at block 712, the method 700 may proceed to decision block 714.

At decision block 714, a determination may be made whether to store an indication. If a determination is made to store an indication, an indication may be stored at block 716. For example, the indication may be an indication not to provide a further alert. Other types of indications may also be stored. If a determination is made not to store an indication at decision block 714, or upon completion of the operations at block 716, the method 700 may terminate.

Figure 8:
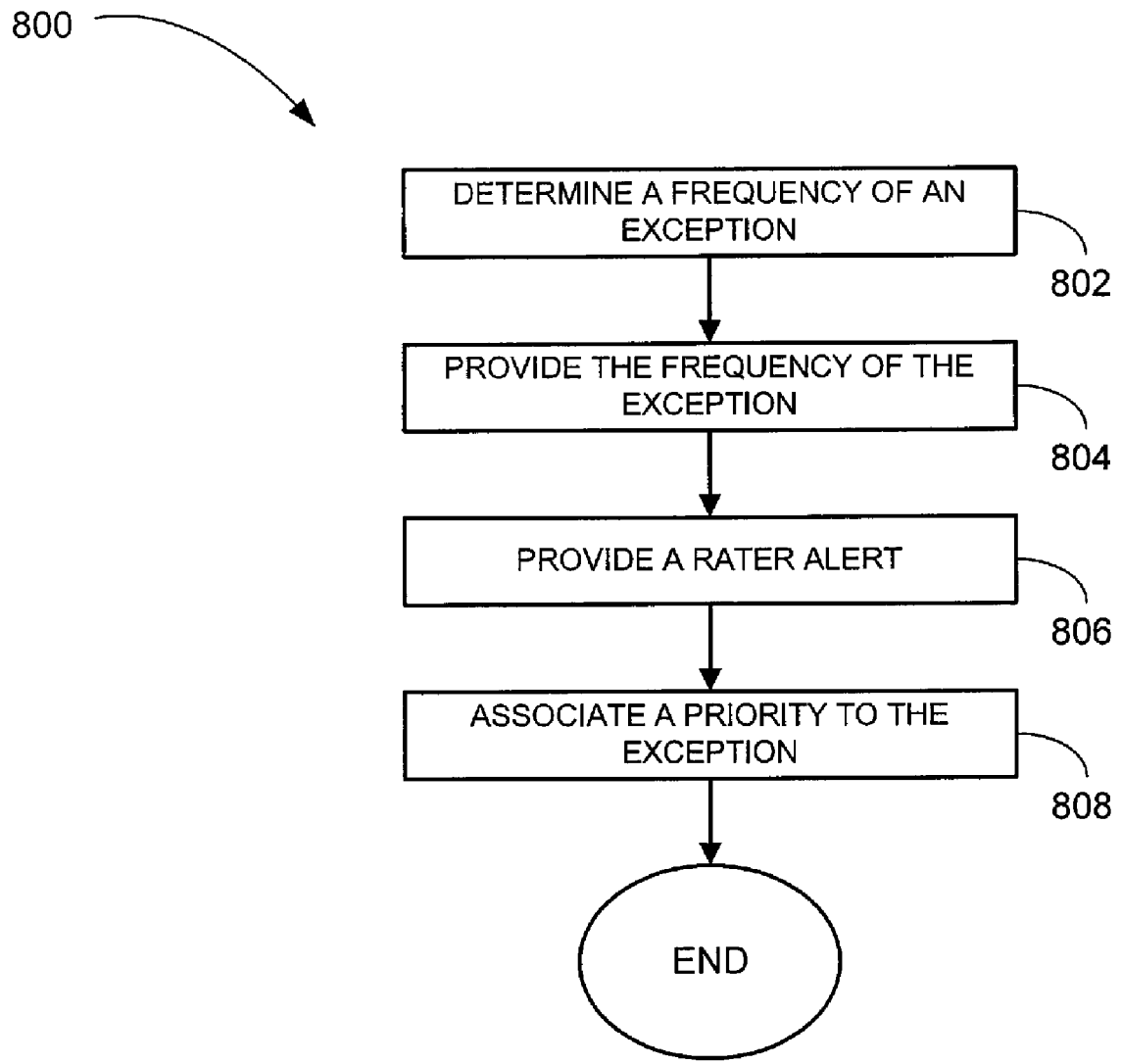
FIG. 8 is a flowchart illustrating a method for alerting according to an example embodiment.

FIG. 8 illustrates a method 800 for alerting according to an example embodiment. The method 800 may be performed by the analyzer 108 (see FIG. 1) or another application in the system 100 or another system.

A frequency of the received exception is determined in a current time period and at least one addition time period at block 802.

The frequency of the received exception in the current time period and the at least one addition time period may be provided at block 804.

A rater alert may be provided based on the determined frequency at block 806.

A priority may be associated with the received exception based on the rater alert at block 808. The priority may define a target time period for resolving the received exception.

Figure 9:
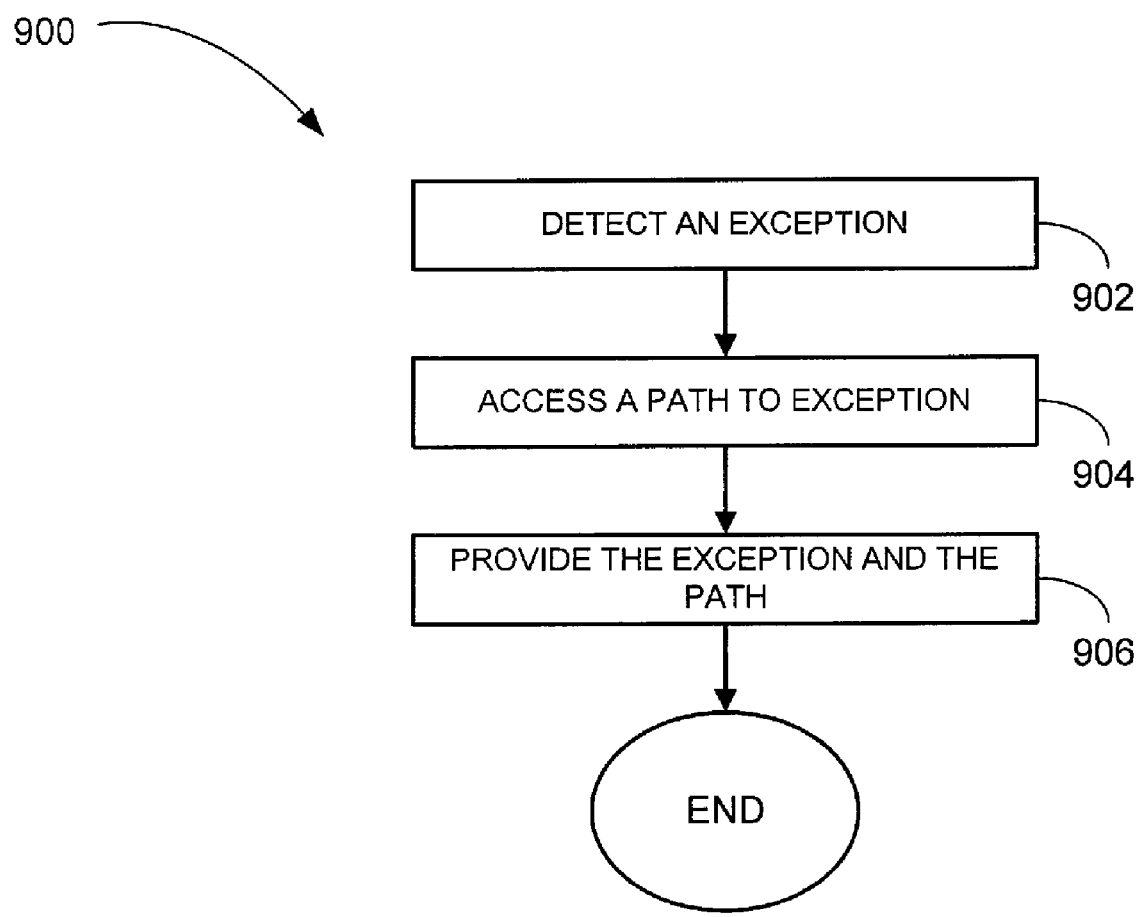
FIG. 9 is a flowchart illustrating a method for alerting according to an example embodiment.

FIG. 9 illustrates a method 900 for alerting according to an example embodiment. The method 900 may be performed by the application 110 (see FIG. 1) or another application in the system 100 or another system.

An exception from an occurrence of an error in the application 110 running in an application space is detected at block 902. The detection may occur as the application 110 throws the exception.

A path to the exception in the application space is accessed at block 904. The path may include an application name, a domain name, company name, a package name, a module name, a class name, and/or a method name for the occurrence of the exception. The exception and the path are provided at block 906.

In an example embodiment, providing the exception and the path to the exception may make a particular exception unique for the application 110 in one or more code spaces.

Figure 10:
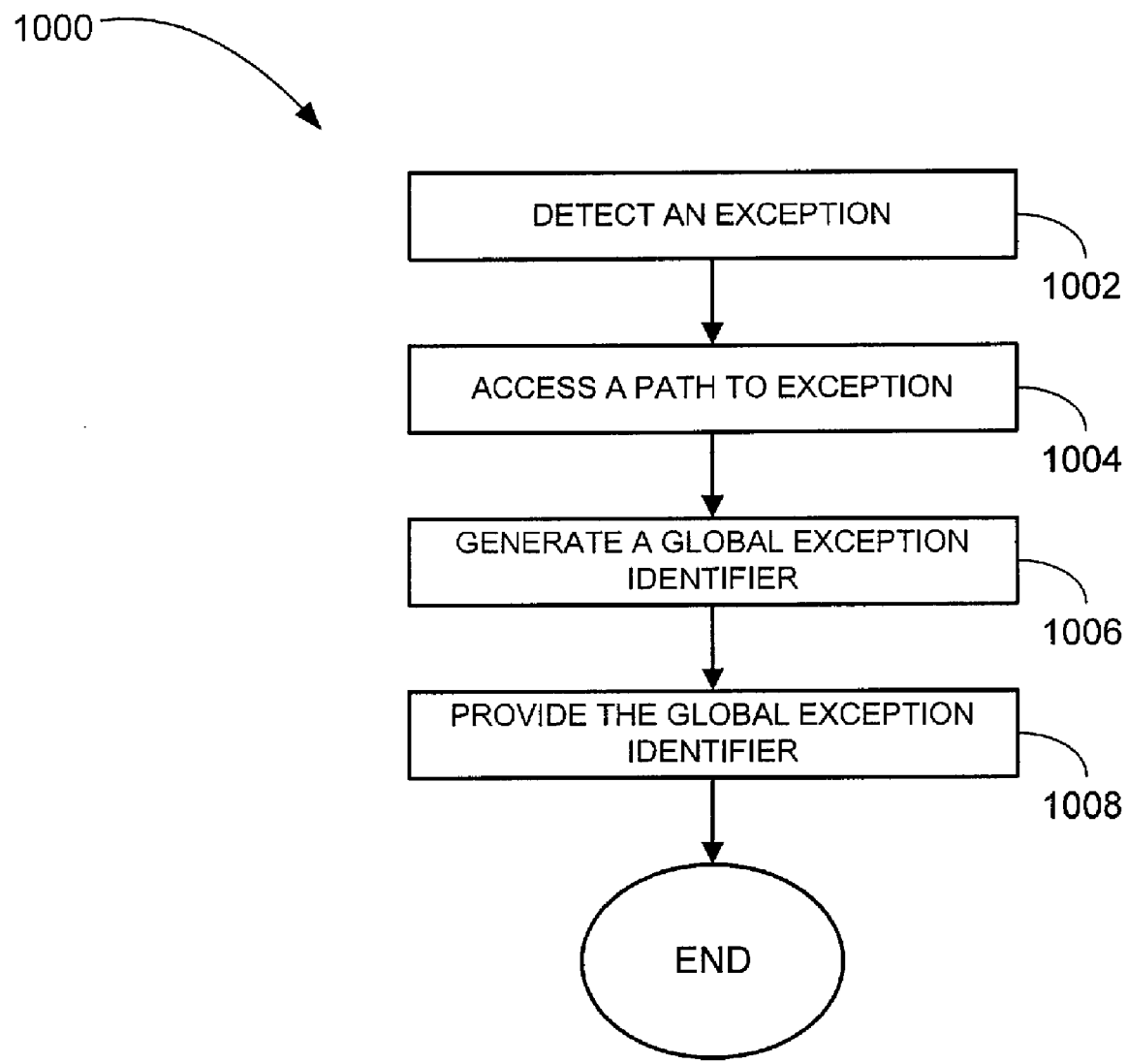
FIG. 10 is a flowchart illustrating a method for alerting according to an example embodiment.

FIG. 10 illustrates a method 1000 for alerting according to an example embodiment. The method 1000 may be performed by the application 110 (see FIG. 1) or another application in the system 100 or another system.

An exception from an occurrence of an error in the application 110 running in an application space is detected at block 1002. A path to the exception in the application space is accessed at block 1004. The path may be hierarchical in the application space.

A global exception identifier is generated at block 1006. The global exception identifier may be associated with a path to the exception and a name of the exception. The global exception identifier may be provided at block 1008.

Figure 11A:
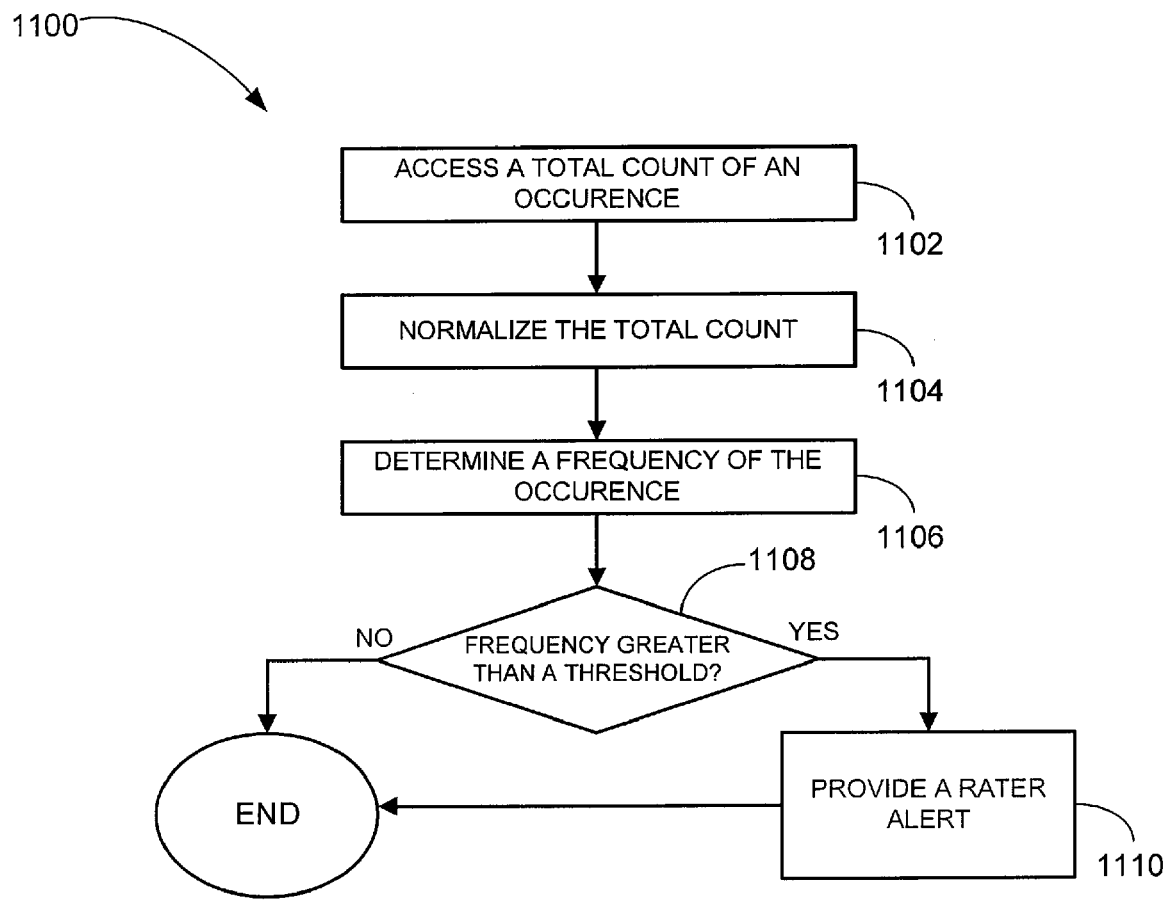
FIG. 11A is a flowchart illustrating a method for alerting according to an example embodiment.

FIG. 11A illustrates a method 1100 for alerting according to an example embodiment. The method 1100 may be performed by the analyzer 108 (see FIG. 1) or another application in the system 100 or another system.

At block 1102, a total count of an occurrence of a parameter in the application 110 is accessed for a current time period and a past time period. The parameter may include an exception in the application, an environmental change in the application, a processing time of the application, usage of a central process unit (CPU), memory usage, a number of transactions using the application and the like.

In an example embodiment, the total count may be accessed by determining the total count of the occurrence of the parameter in the application 110.

At block 1104, the total count of the current time period is normalized based on information regarding measurement of the total count during the past time period. For example, normalization may include using known traffic (e.g., a number of requests) to compare time periods.

The information regarding measurement may include, by way of example, a total number of users making requests, a day of a week, an hour of a day, an amount of traffic to the application, and the like. Normalization may enable the selection of a specific time period for comparison.

A frequency of the occurrence of the parameter is determined for the current time period and the past time period based on the normalized total count at block 1106.

A determination is made at decision block 1108 as to whether the frequency of the current time period compared to the past time period is greater than a threshold. If the frequency difference is greater than a threshold, a rater alert is provided to a user at block 1110. For example, the threshold may be one or more standard deviations away from the median value, but other thresholds may also be used. Providing the rater alert may include presenting a graph of the frequency of the occurrence from the current time period and the past time period to a user. If the frequency difference is not greater than a threshold at decision block 1108 or upon completion of the operations at block 1110, the method 1100 may terminate.

Figure 11B:
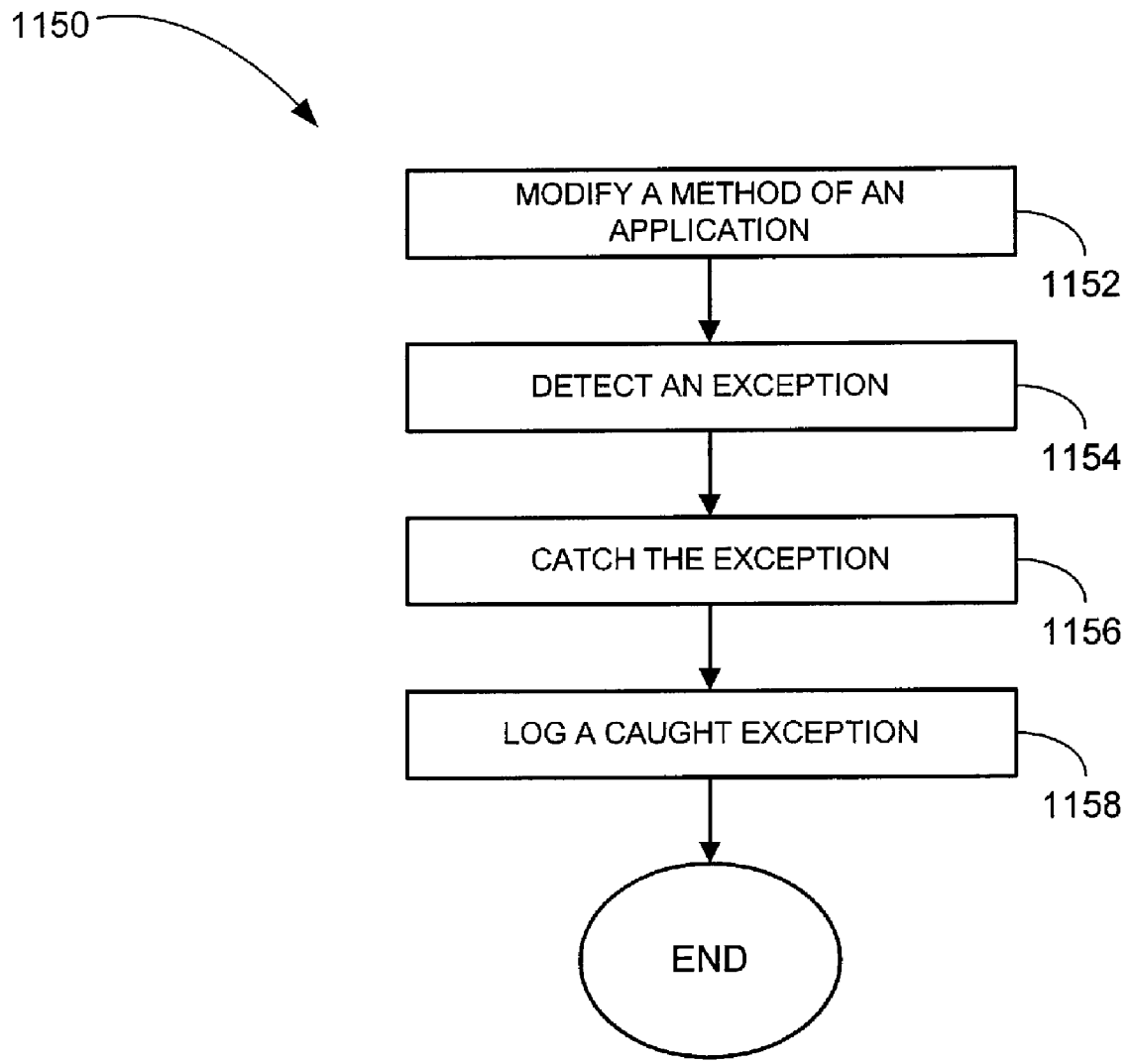
FIG. 11B is a flowchart illustrating a method for logging according to an example embodiment.

FIG. 11B illustrates a method 1100 for logging according to an example embodiment. The method 1100 may be performed by the instrumentation 118 (see FIG. 1) or another application in the system 100 or another system.

One or more methods of the application 110 are modified at block 1152. One or more exceptions are detected from the modifying of the method not logged by a developer at block 1154. The operations performed at block 1152 and block 1154 may be performed at run-time or otherwise performed.

The one or more exceptions are caught to create at least one caught exception at block 1156.

The one or more caught exceptions are logged to a log file at block 1158. In an example embodiment, the log filed may be used by the analyzer 108 to analyze all exceptions instead of just the exceptions logged by the developer.

Figure 12:
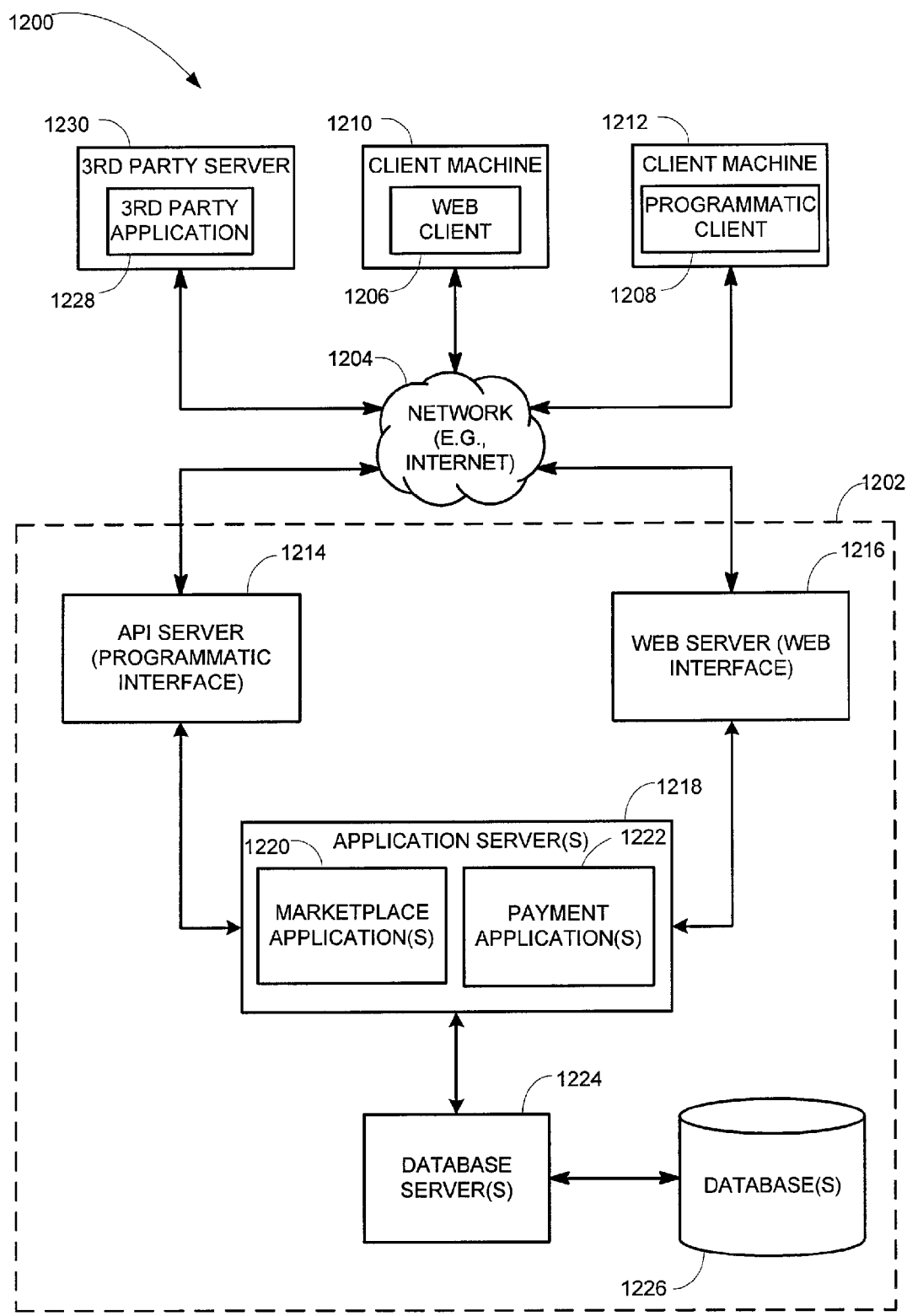
FIG. 12 is a network diagram depicting a network system, according to one embodiment, having a client server architecture configured for exchanging data over a network.

FIG. 12 is a network diagram depicting a client-server system 1200, within which one example embodiment may be deployed. By way of example, a network 1204 may include the functionality of the network 104, the servers 106 may be deployed within an application server 1218, the client machine 102 may include the functionality of a client machine 1210 or a client machine 1212, and a database 1226 may include the functionality of the database 116. The system 100 may also be deployed in other systems.

A networked system 1202, in the example forms of a network-based marketplace or publication system, provides server-side functionality, via a network 1204 (e.g., the Internet or Wide Area Network (WAN)) to one or more clients. FIG. 12 illustrates, for example, a web client 1206 (e.g., a browser, such as the Internet Explorer browser developed by Microsoft Corporation of Redmond, Wash. State), and a programmatic client 1208 executing on respective client machines 1210 and 1212.

An Application Program Interface (API) server 1214 and a web server 1216 are coupled to, and provide programmatic and web interfaces respectively to, one or more application servers 1218. The application servers 1218 host one or more marketplace applications 1220 and authentication providers 1222. The application servers 1218 are, in turn, shown to be coupled to one or more databases servers 1224 that facilitate access to one or more databases 1226.

The marketplace applications 1220 may provide a number of marketplace functions and services to users that access the networked system 1202. The authentication providers 1222 may likewise provide a number of payment services and functions to users. The authentication providers 1222 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1220. While the marketplace and authentication providers 1220 and 1222 are shown in FIG. 12 to both form part of the networked system 1202, in alternative embodiments the authentication providers 1222 may form part of a payment service that is separate and distinct from the networked system 1202.

Further, while the system 1200 shown in FIG. 12 employs a client-server architecture, the present invention is of course not limited to such an architecture, and could equally well find application in a distributed, or peer-to-peer, architecture system, for example. The various marketplace and authentication providers 1220 and 1222 could also be implemented as standalone software programs, which need not have networking capabilities.

The web client 1206 accesses the various marketplace and authentication providers 1220 and 1222 via the web interface supported by the web server 1216. Similarly, the programmatic client 1208 accesses the various services and functions provided by the marketplace and authentication providers 1220 and 1222 via the programmatic interface provided by the API server 1214. The programmatic client 1208 may, for example, be a seller application (e.g., the TurboLister™ application developed by eBay Inc., of San Jose, Calif.) to enable sellers to author and manage listings on the networked system 1202 in an off-line manner, and to perform batch-mode communications between the programmatic client 1208 and the networked system 1202.

FIG. 12 also illustrates a third party application 1228, executing on a third party server machine 1230, as having programmatic access to the networked system 1202 via the programmatic interface provided by the API server 1214. For example, the third party application 1228 may, utilizing information retrieved from the networked system 1202, support one or more features or functions on a website hosted by the third party. The third party may, for example, provide one or more promotional, marketplace or payment functions that are supported by the relevant applications of the networked system 1202.

Figure 13:
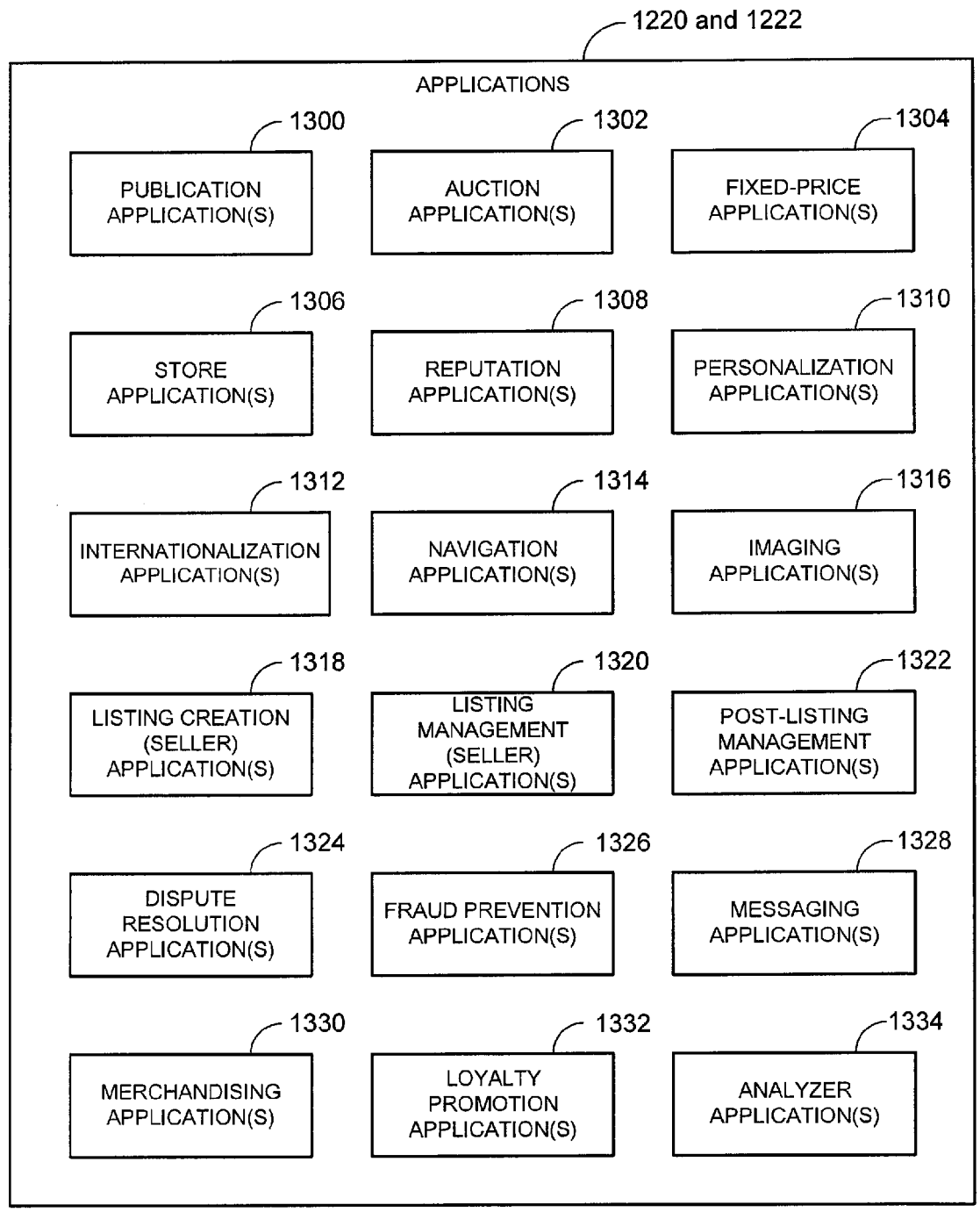
FIG. 13 is a block diagram illustrating an example embodiment of multiple network and marketplace applications, which are provided as part of the network-based marketplace.

FIG. 13 is a block diagram illustrating multiple applications 1220 and 1222 that, in one example embodiment, are provided as part of the networked system 1202 (see FIG. 12). The applications 1220 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1226 via the database servers 1224.

The networked system 1202 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1220 are shown to include at least one publication application 1110 and one or more auction applications 1302 which support auction-format listing and price setting mechanisms (e.g., English, Dutch, Vickrey, Chinese, Double, Reverse auctions etc.). The various auction applications 1302 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1304 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1306 allow a seller to group listings within a "virtual" store, which may be branded and otherwise personalized by and for the seller. Such a virtual store may also offer promotions, incentives and features that are specific and personalized to a relevant seller.

Reputation applications 1308 allow users that transact, utilizing the networked system 1202, to establish, build and maintain reputations, which may be made available and published to potential trading partners. Consider that where, for example, the networked system 1202 supports person-to-person trading, users may otherwise have no history or other reference information whereby the trustworthiness and credibility of potential trading partners may be assessed. The reputation applications 1308 allow a user, for example through feedback provided by other transaction partners, to establish a reputation within the networked system 1202 over time. Other potential trading partners may then reference such a reputation for the purposes of assessing credibility and trustworthiness.

Personalization applications 1310 allow users of the networked system 1202 to personalize various aspects of their interactions with the networked system 1202. For example a user may, utilizing an appropriate personalization application 1310, create a personalized reference page at which information regarding transactions to which the user is (or has been) a party may be viewed. Further, a personalization application 1310 may enable a user to personalize listings and other aspects of their interactions with the networked system 1202 and other parties.

The networked system 1202 may support a number of marketplaces that are customized, for example, for specific geographic regions. A version of the networked system 1202 may be customized for the United Kingdom, whereas another version of the networked system 1202 may be customized for the United States. Each of these versions may operate as an independent marketplace, or may be customized (or internationalized and/or localized) presentations of a common underlying marketplace. The networked system 1202 may accordingly include a number of internationalization applications 1312 that customize information (and/or the presentation of information) by the networked system 1202 according to predetermined criteria (e.g., geographic, demographic or marketplace criteria). For example, the internationalization applications 1312 may be used to support the customization of information for a number of regional websites that are operated by the networked system 1202 and that are accessible via respective web servers 1216.

Navigation of the networked system 1202 may be facilitated by one or more navigation applications 1314. For example, a search application (as an example of a navigation application) may enable key word searches of listings published via the networked system 1202. A browse application may allow users to browse various category, catalogue, or system inventory structures according to which listings may be classified within the networked system 1202. Various other navigation applications may be provided to supplement the search and browsing applications.

In order to make listings available via the networked system 1202 as visually informing and attractive as possible, the marketplace applications 1220 may include one or more imaging applications 1316 utilizing which users may upload images for inclusion within listings. An imaging application 1316 also operates to incorporate images within viewed listings. The imaging applications 1316 may also support one or more promotional features, such as image galleries that are presented to potential buyers. For example, sellers may pay an additional fee to have an image included within a gallery of images for promoted items.

Listing creation applications 1318 allow sellers conveniently to author listings pertaining to goods or services that they wish to transact via the networked system 1202, and listing management applications 1320 allow sellers to manage such listings. Specifically, where a particular seller has authored and/or published a large number of listings, the management of such listings may present a challenge. The listing management applications 1320 provide a number of features (e.g., auto-relisting, inventory level monitors, etc.) to assist the seller in managing such listings. One or more post-listing management applications 1322 also assist sellers with a number of activities that typically occur post-listing. For example, upon completion of an auction facilitated by one or more auction applications 1302, a seller may wish to leave feedback regarding a particular buyer. To this end, a post-listing management application 1322 may provide an interface to one or more reputation applications 1308, so as to allow the seller conveniently to provide feedback regarding multiple buyers to the reputation applications 1308.

Dispute resolution applications 1324 provide mechanisms whereby disputes arising between transacting parties may be resolved. For example, the dispute resolution applications 1324 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1326 implement fraud detection and prevention mechanisms to reduce the occurrence of fraud within the networked system 1202.

Messaging applications 1328 are responsible for the generation and delivery of messages to users of the networked system 1202, such messages for example advising users regarding the status of listings at the networked system 1202 (e.g., providing "outbid" notices to bidders during an auction process or to provide promotional and merchandising information to users). Respective messaging applications 1328 may utilize any one have a number of message delivery networks and platforms to deliver messages to users. For example, messaging applications 1328 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1330 support various merchandising functions that are made available to sellers to enable sellers to increase sales via the networked system 1202. The merchandising applications 1330 also operate the various merchandising features that may be invoked by sellers, and may monitor and track the success of merchandising strategies employed by sellers.

The networked system 1202 itself, or one or more parties that transact via the networked system 1202, may operate loyalty programs that are supported by one or more loyalty/promotions applications 1332. For example, a buyer may earn loyalty or promotions points for each transaction established and/or concluded with a particular seller, and may be offered a reward for which accumulated loyalty points can be redeemed.

An analyzer application 1334 may receive exceptions from the application 1110-1332 and/or other applications. The analyzer application 1334 may include the functionality of the analyzer 108 (see FIG. 1) to process the exception.

Figure 14:
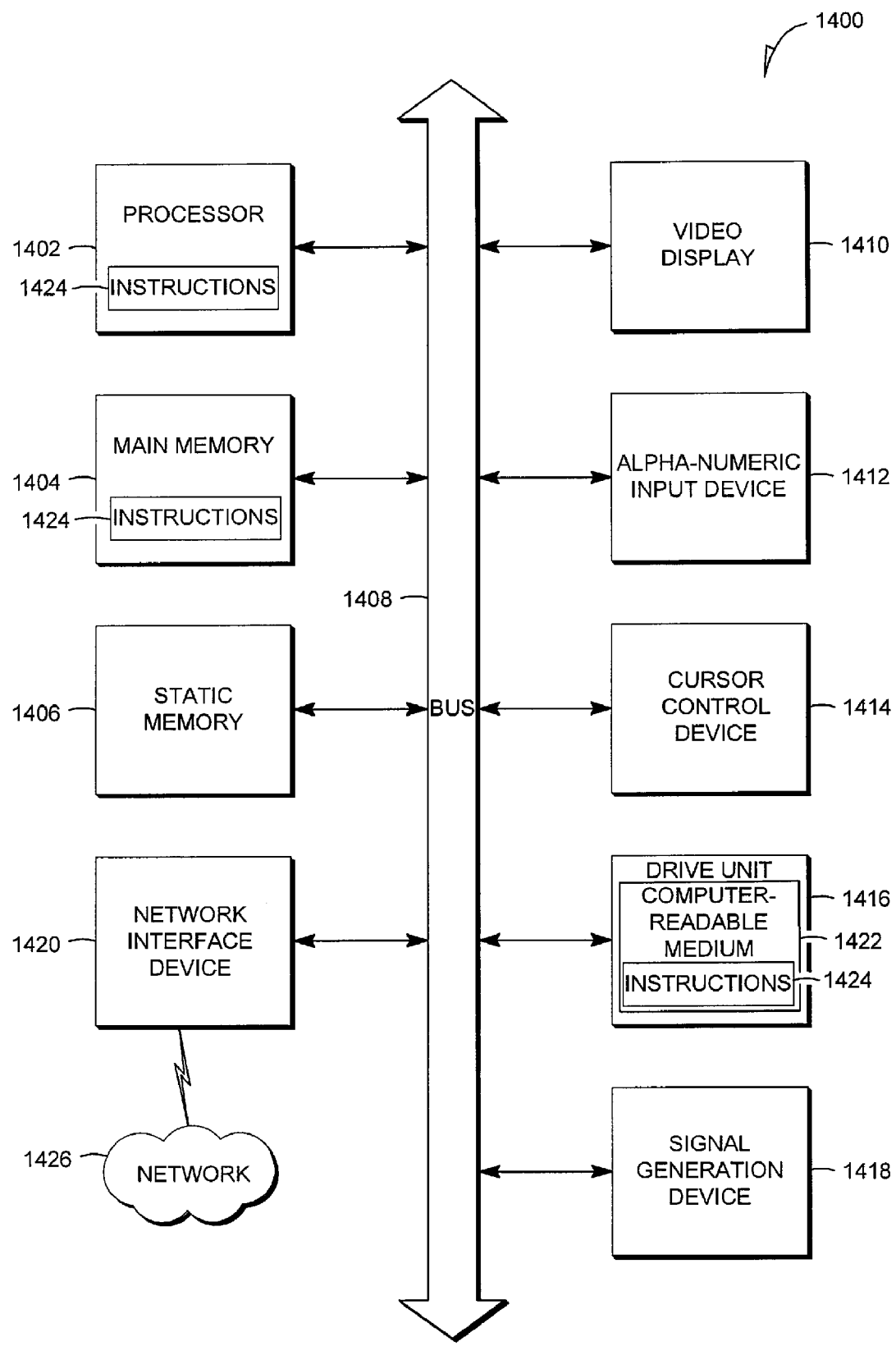
FIG. 14 is a block diagram diagrammatic representation of machine in the example form of a computer system within which a set of instructions for causing the machine to perform any one or more of the methodologies discussed herein may be executed.

FIG. 14 shows a diagrammatic representation of machine in the example form of a computer system 1400 within which a set of instructions may be executed causing the machine to perform any one or more of the methods, processes, operations, or methodologies discussed herein. The servers 106 may operate on or more computer systems 1400 and/or the client machine 102 may include the functionality of the computer system 1400.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU) a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a drive unit 1416, a signal generation device 1418 (e.g., a speaker) and a network interface device 1420.

The drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for handling exceptions and alerts have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing a total count of an occurrence of a parameter in an application for a current time period and a past time period;
    normalizing, using one or more processors, the total count of the current time period based on another count during the current time period, wherein the total count of the current time period is normalized based on information regarding measurement, the information regarding measurement is one or more of a total number of users making requests, a day of a week, an hour of a day, or an amount of traffic to the application;
    determining a frequency of the occurrence of the parameter for the current time period and the past time period based on the normalized total count;
    determining whether the frequency of the current time period compared to the past time period transgresses a threshold; and
    based on the determination, providing a rater alert to a user, the rater alert including presentation of a graph of the frequency of the occurrence from the current time period and the past time period to the user.

2. The method of claim 1, wherein the accessing of the total count comprises:

determining the total count of the occurrence of the parameter in the application for the current time period and the past time period.

3. The method of claim 1, wherein the providing of the rater alert comprises:

presenting a graph of the frequency of the occurrence from the current time period and the past time period to a user.

4. The method of claim 1, wherein the parameter is selected from a group of parameters consisting of an exception in the application, an environmental change in the application, a processing time of the application, usage of a central process unit (CPU), memory usage, and a number of transactions using the application.

5. A machine-readable medium comprising instructions, which when implemented by one or more processors perform the following operations:

accessing a total count of an occurrence of a parameter in an application for a current time period and a past time period;

normalizing, using one or more processors, the total count of the current time period based on another count during the current time period, wherein the total count of the current time period is normalized based on information regarding measurement, the information regarding measurement is one or more of a total number of users making requests, a day of a week, an hour of a day, or an amount of traffic to the application;

determining a frequency of the occurrence of the parameter for the current time period and the past time period based on the normalized total count;

determining whether the frequency of the current time period compared to the past time period transgresses a threshold; and based on the determination, providing a rater alert to a user, the rater alert including presentation of a graph of the frequency of the occurrence from the current time period and the past time period to the user.

6. The machine-readable medium of claim 5, wherein the accessing of the total count comprises:

determining the total count of the occurrence of the parameter in the application for the current time period and the past time period.

7. The machine-readable medium of claim 5, wherein the providing of the rater alert comprises:

presenting a graph of the frequency of the occurrence from the current time period and the past time period to a user.

8. The machine-readable medium of claim 5, wherein the parameter is selected from a group of parameters consisting of an exception in the application, an environmental change in the application, a processing time of the application, usage of a central process unit (CPU), memory usage, and a number of transactions using the application.

* * * * *